United States Patent
Yamamoto et al.

(10) Patent No.: US 9,221,403 B2
(45) Date of Patent: Dec. 29, 2015

(54) INTERIOR PART FOR VEHICLE AND METHOD FOR TREATING EDGE THEREOF

(71) Applicant: MEIWA INDUSTRY CO., LTD., Atsugi-shi, Kanagawa (JP)

(72) Inventors: Satoru Yamamoto, Minokamo (JP); Takashi Kobayashi, Minokamo (JP)

(73) Assignee: MEIWA INDUSTRY CO., LTD., Atsugi-shi (JP)

(*) Notice: Subject to any disclaimer, the term of this patent is extended or adjusted under 35 U.S.C. 154(b) by 0 days.

(21) Appl. No.: 13/829,203

(22) Filed: Mar. 14, 2013

(65) Prior Publication Data

US 2013/0273323 A1    Oct. 17, 2013

(30) Foreign Application Priority Data

Apr. 17, 2012 (JP) ................................. 2012-093537

(51) Int. Cl.
*B60R 13/02* (2006.01)
*B62D 65/14* (2006.01)
(Continued)

(52) U.S. Cl.
CPC ............... *B60R 13/02* (2013.01); *B29C 66/034* (2013.01); *B29C 66/112* (2013.01); *B29C 66/131* (2013.01); *B29C 66/1312* (2013.01); *B29C 66/3262* (2013.01); *B29C 66/72521* (2013.01);
(Continued)

(58) Field of Classification Search
CPC ............... B60R 2013/0293; B60R 2021/2076; B60R 22/22; B60R 13/02; B29C 2049/2008; B29C 2049/2065; B29C 2791/001; B29C 49/0047; B29C 49/20; B29C 51/12; B29C 51/14; B29C 66/034; B29C 66/112; B29C 66/131; B29C 66/1312; B29C 66/3262; B29C 66/72521; B32B 27/08; B32B 27/12; B32B 27/20; B32B 27/32; B32B 3/02; B32B 3/28; B32B 5/022; B32B 5/08; B32B 7/12; B62D 65/14
USPC ........ 428/177, 192, 157; 156/196; 296/146.7, 296/1.08
See application file for complete search history.

(56) References Cited

U.S. PATENT DOCUMENTS

2010/0021675 A1* 1/2010 Hasegawa et al. .............. 428/57

FOREIGN PATENT DOCUMENTS

| JP | 06-305062 A | 11/1994 | | |
| JP | 06305062 A | * 11/1994 | ................ | B32B 3/26 |
| JP | 2000167954 A | * 6/2000 | ................ | B32B 3/28 |

OTHER PUBLICATIONS

JP 2000167954 A; AIPN machine translation.*

(Continued)

*Primary Examiner* — Prashant J Khatri
*Assistant Examiner* — Travis Figg
(74) *Attorney, Agent, or Firm* — Foley & Lardner LLP

(57) ABSTRACT

An interior part for a vehicle includes a body member including protrusions and depressions, a first member having a flat sheet shape and attached to one side of the body member, and a second member having a flat sheet shape and attached to another side of the body member. An edge of the side end of the first member is fixed with an edge of the side end of the second member in a convex manner via an edge of a side end of the body member. The edges of the first member, the body member and the second member are processed by a chamfer treatment to form an inclined portion outwardly inclined from the second member toward the first member. According to the interior part, unpleasant feeling to be brought to a user when touching the inclined portion is drastically restricted.

5 Claims, 6 Drawing Sheets

(51) Int. Cl.
  *B32B 3/02*    (2006.01)
  *B29C 65/00*   (2006.01)
  *B32B 5/02*    (2006.01)
  *B32B 5/08*    (2006.01)
  *B32B 7/12*    (2006.01)
  *B32B 27/08*   (2006.01)
  *B32B 27/12*   (2006.01)
  *B32B 27/20*   (2006.01)
  *B32B 27/32*   (2006.01)
  *B32B 3/28*    (2006.01)
  *B60R 5/04*    (2006.01)
  *B29L 31/30*   (2006.01)

(52) U.S. Cl.
  CPC ... *B32B 3/02* (2013.01); *B32B 3/28* (2013.01); *B32B 5/022* (2013.01); *B32B 5/08* (2013.01); *B32B 7/12* (2013.01); *B32B 27/08* (2013.01); *B32B 27/12* (2013.01); *B32B 27/20* (2013.01); *B32B 27/32* (2013.01); *B62D 65/14* (2013.01); *B29C 66/438* (2013.01); *B29L 2031/3041* (2013.01); *B32B 2250/40* (2013.01); *B32B 2262/0253* (2013.01); *B32B 2262/0276* (2013.01); *B32B 2262/14* (2013.01); *B32B 2264/10* (2013.01); *B32B 2605/003* (2013.01); *B60R 5/044* (2013.01); *Y10T 156/1002* (2015.01); *Y10T 428/24488* (2015.01)

(56) References Cited

OTHER PUBLICATIONS

JP 2000167954 A; Drawings.*
Definition of Side.*
JP 06305062 A Machine Translation (accessed on the web Apr. 1, 2015).*

* cited by examiner

INTERIOR PART FOR VEHICLE AND METHOD FOR TREATING EDGE THEREOF

BACKGROUND OF THE INVENTION

1. Technical Field

The present invention relates to an interior part for a vehicle and a method for treating an edge thereof.

2. Background Arts

Various interior parts are attached to an inside of a vehicle body in order to improve interior appearance of a passenger compartment as disclosed in Japanese Patent Application Laid-Open No. 1106-305062 (Patent Document 1).

An interior part (a plastic corrugated board with a fabric skin) disclosed in the Patent Document 1 is formed by placing a corrugated plastic hoard with a fabric skin on a heat block and then pushes a cutter blade onto a portion of the plastic board placed on the heat block. The plastic board and the fabric skin are bent downward by the cutter blade, and then cut apart by the cutter blade. Its cut edges are melted by the heat block, so that the edges are sealed.

SUMMARY OF THE INVENTION

However, the cut edges of the interior part (plastic corrugated board) become sharp edges, so that the sharp edges bring unpleasant feeling to a user when he/she touches the edges of the interior part.

An object of the present invention is to provide an interior part for a vehicle that hardly brings unpleasant feeling to a user when touched by the user, and a method for treating an edge of the interior part.

A first aspect of the present invention provides an interior part for a vehicle that includes a body member that is made of plastic and includes a plurality of protrusions and a plurality of depressions, a first member that is made of plastic to have a flat sheet shape and attached to one side of the body member, and a second member that is made of plastic to have a flat sheet shape and attached to another side of the body member. A side end of the first member is extended toward a side end of the second member in a convex manner. An edge of the side end of the first member is fixed with an edge of the side end of the second member via an edge of a side end of the body member. The edges of the first member, the body member and the second member are processed by a chamfer treatment to form an inclined portion outwardly inclined from the second member toward the first member.

A second aspect of the present invention provides a method for treating an edge of an interior part that includes a body member that is made of plastic and includes a plurality of protrusions and a plurality of depressions, a first member that is made of plastic to have a flat sheet shape and attached to one side of the body member, and a second member that is made of plastic to have a flat sheet shape and attached to another side of the body member. The method includes: making an intermediate molded part by bending a side end of the first member toward a side end of the second member in a convex manner and then fixing an edge of the side end of the first member with an edge of the side end of the second member via an edge of a side end of the body member, heating a heat block provided with an inclined face whose inclined angle is set to 45° to 65° to 160° C. to 190° C.; and pressing the edges of the first member, the body member and the second member onto the inclined face of the heat block for five to ten seconds to form an inclined portion.

According to the above aspects, the inclined portion is outwardly inclined from the second member toward the first member, so that unpleasant feeling to be brought to a user when touching the inclined portion is drastically restricted.

DESCRIPTION OF THE EMBODIMENTS

Hereinafter, an interior part (a deck board) 9 according to an embodiment will be explained with reference to the drawings.

Figure 1:
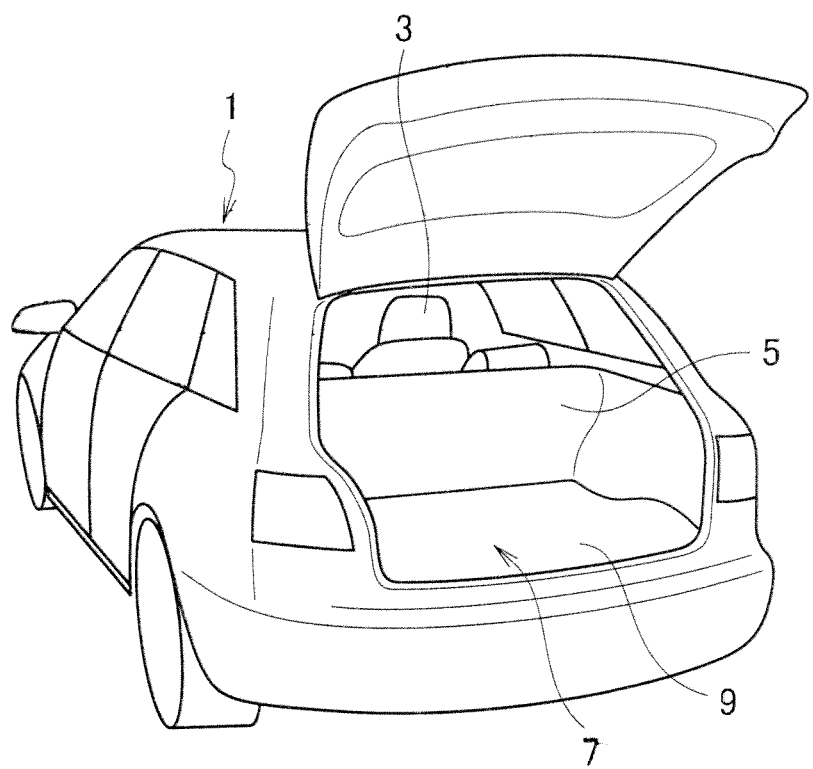
FIG. 1 is a perspective rear view of a vehicle to which an interior part (a deck board) according to an embodiment is installed.
Figure 2:
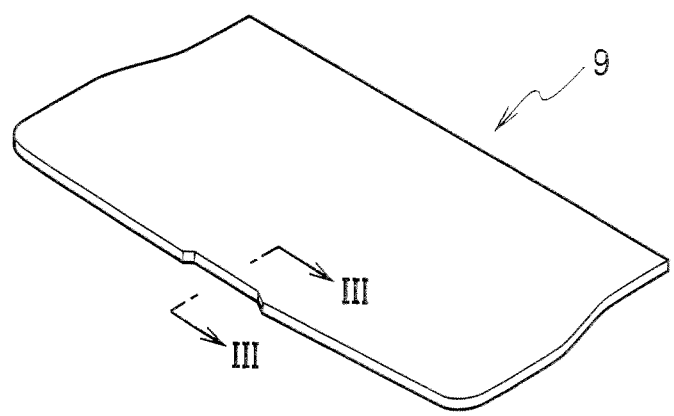
FIG. 2 is a perspective view of the deck board.

As shown in FIG. 1, front seats 3 and rear seats 5 are provided in a passenger compartment of a vehicle 1. A luggage space 7 is provided behind the rear seats 5. A storage space (not shown) is also provided below a floor of the luggage space 7. A spare tire, tools and so on are housed in the storage space. A deck board (an interior part) 9 according to an embodiment is provided at the floor to cover the storage space. As shown in FIG. 2, the deck board is made of plastic to have an almost rectangular plate shape.

Figure 3:
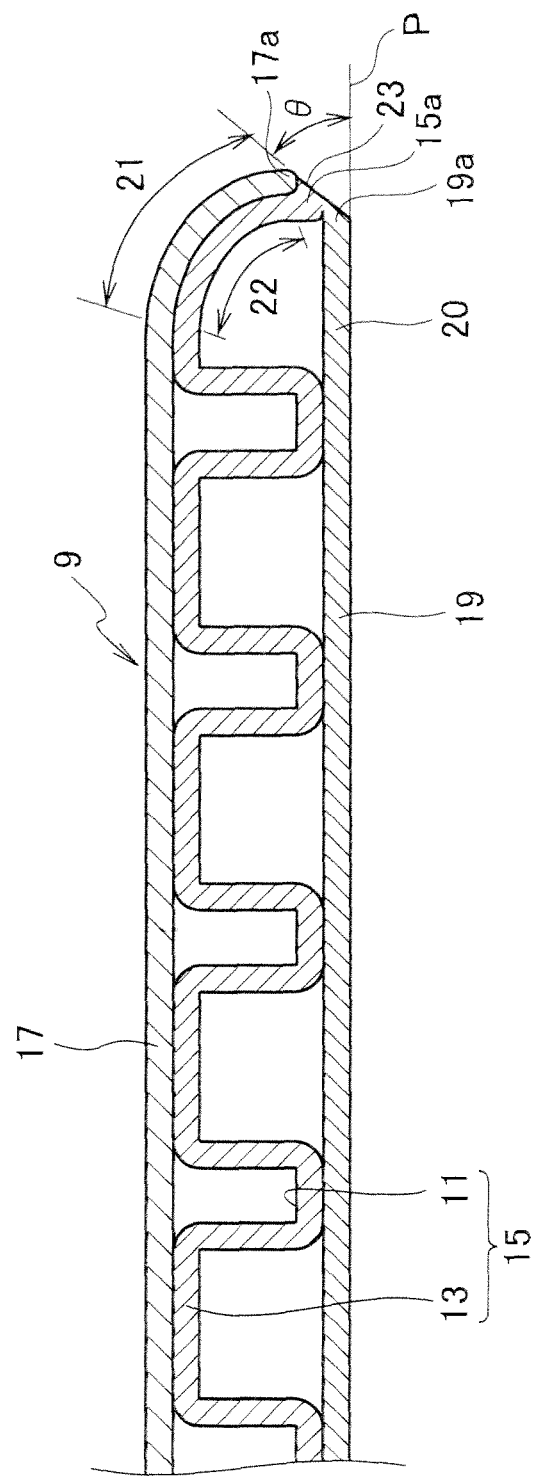
FIG. 3 is a cross-sectional view taken along a line shown in FIG. 2.

As shown in FIG. 3, the deck board 9 includes a body member 15, a first member 17 and a second member 19. All the members 15, 17 and 19 are made of plastic. The body member 15 has a corrugated shape to form protrusions 11 and depressions 13 alternately. The first member 17 has a flat sheet shape and is attached to a face side (an upper surface side) of the body member 15. The second member 19 also has a flat sheet shape and is attached to a back side (an lower surface side) of the body member 15.

Each of the depressions 13 of the body member 15 is formed to have a rectangular cross-sectional shape protruded upward, and its top is attached to a lower surface of the first member 17. In addition, each of the protrusions 11 of the body member 15 is formed to have a rectangular cross-sectional shape protruded downward, and its bottom is attached to an upper surface of the second member 19.

As shown in FIG. 3, a side end 21 of the first member 17 is extended toward an edge 19a of a side end 20 of the second member 19 in a convex manner. An edge 17a of the side end 21 is fixed with the edge 19a via an edge 15a of a side end 22 of the body member 15. Specifically, the side end 21 of the first member 17 is curved to have a J-shaped in its cross-section, and extends downward in FIG. 3. In addition, the side end 22 of the body member 15 is also curved along the side end 21 of the first member 17 to have a J-shaped in its cross-section. Then, the edges 17a, 15a and 19a are integrally fixed with each other.

Figure 4:
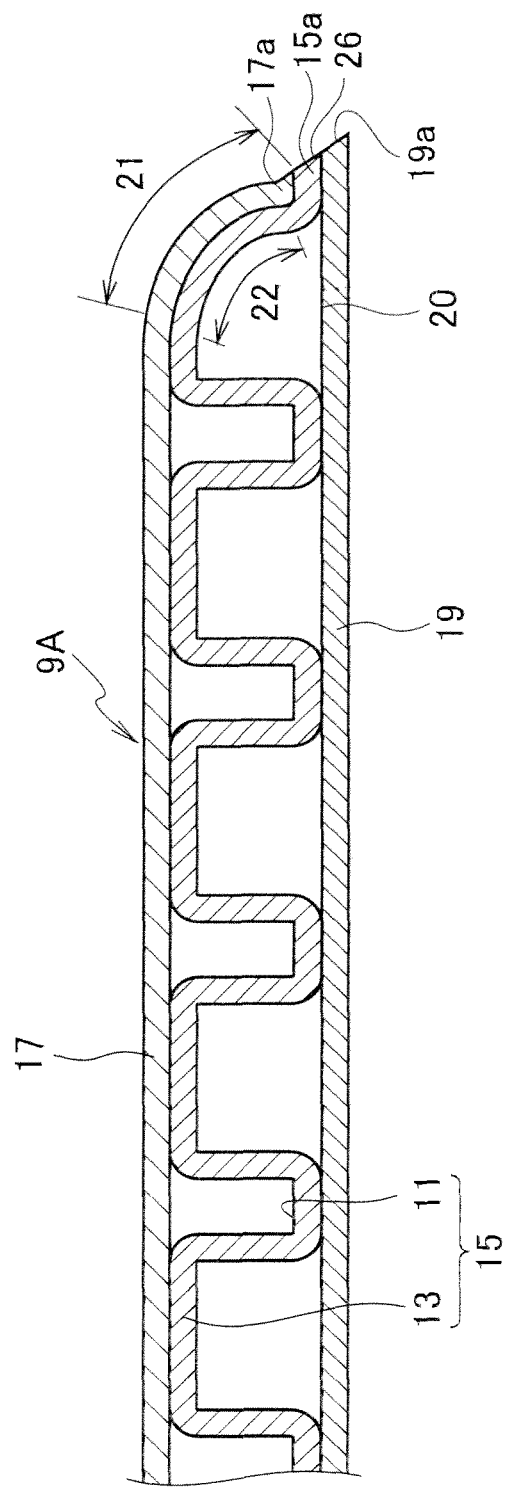
FIG. 4 is a cross-sectional view of an intermediate molded board during forming the deck board.

Here, the edges 17a, 15a and 19a are formed to have an inclined portion 23 inclined upward and outward (rightward) in FIG. 3 by being processed with an after-explained chamfer treatment. Namely, the inclined portion 23 is outwardly inclined from the second member 19 toward the first member 17. An inclined angle θ formed by an extended direction of the inclined portion 23 and a planar direction P of the second member 19 is set to 45° to 65°, preferably set to 50° to 60°. If the inclined angle θ is smaller than 45°, the edge 19a of the second member 19 may be formed as a sharp edge protruding in the planar direction P as shown in FIG. 4 and thereby the sharp edge may bring unpleasant feeling to a user when he/she touches the edge of the deck board 9. If the inclined angle θ is larger than 65°, the inclined portion 23 may excessively squashed by the after-explained chamfer treatment using heat and thereby appearance of the edge of the deck board 9 may degraded and weld flashes may be formed frequently.

As material for the members 15, 17 and 19, synthetic resins listed below are preferable. Such synthetic resins may be polyolefin resin (such as low-density polyethylene, high-density polyethylene, liner low-density polyethylene, polypropylene homopolymer, polypropylene random copolymer, and polypropylene block copolymer), comonomer of these, and copolymer of the comonomer and another comonomer; and polyvinyl chloride, chlorinated polyvinyl chloride, ABS, AAS, AES, polystyrene, polyethylene telephthalate, polycarbonate, polyamide, polyvinylidene fluoride, polyphenylene sulfide, polysulfone, polyether ketone, comonomer of these, and copolymer of the comonomer and another comonomer. These resins may be used independently or in combination therewith. Various thermoplastic resins may be used as explained above, but polypropylene resin is most preferable in view of balance of properties such as costs, moldability, physical property, cold-resisting property and heat-resisting property.

Note that filler may be mixed as a subsidiary material. The subsidiary material is not limited, but talc, calcium carbonate or the like is preferable in view of balance of properties such as costs, moldability and operability. Since increase of an additive amount of the filler may bring increase of costs and/or specific gravity, it is preferable that an additive amount of talc is 5 to 30 wt % to a total weight in view of balance of these properties. And, it is preferable that and an additive amount of calcium carbonate is equal-to or smaller-than 20 wt % to a total weight. Further, antioxidant, UV absorber, antistat, antimicrobial, fire-retardant, light stabilizer, lubricant or the like may be mixed in addition to the filler.

In addition, product thickness of the deck board 9 is preferably 3 to 10 mm, and weight per unit area of the deck board 9 is preferably 1000 to 3000 g/m$^2$.

Note that a skin material may be attached to an outer surface of the first member 17 and/or an outer surface of the second member 19 by adhesive bonding, thermal fusion bonding and so on. Non-woven fabric, raised fabric, artificial leather sheet, synthetic resin film, one of these materials that is lined with a cushion sheet and so on may be adopted as such a skin material. Especially, most preferable is needle-punched non-woven fabric having 20 to 500 g/m$^2$ that is made from popular non-woven fabric, polyester fiber independently, or mixed fiber with polyester fiber as main material with 20 wt % addition of polypropylene fiber.

Next, a method for treating the edge of the interior part (deck board) 9 according to an embodiment will be explained with reference to FIGS. 4 to 7.

As shown in FIG. 4, an intermediate molded board (part) 9A for finally producing the deck board 9 is made. The intermediate molded board 9A is made by a common method (e.g. as disclosed by the Patent Document 1), so that detailed explanations for the method will be omitted here. The intermediate molded board 9A also includes the body member 15, the first member 17 and the second member 19. All the members 15, 17 and 19 are made of plastic. The body member 15 has a corrugated shape to form the protrusions 11 and the depressions 13 alternately. The first member 17 has a flat sheet shape and is attached to the face side (upper surface side) of the body member 15. The second member 19 also has a flat sheet shape and is attached to the back side (lower surface side) of the body member 15. However, the edge 15a of the body member 15, the edge 17a of the first member 17 and the edge 19a of the second member 19 forms a sharp face 26 inclined downward and outward (rightward) in FIG. 4. Therefore, the edge 19a of the second member 19 forms a sharp edge.

Figure 5:
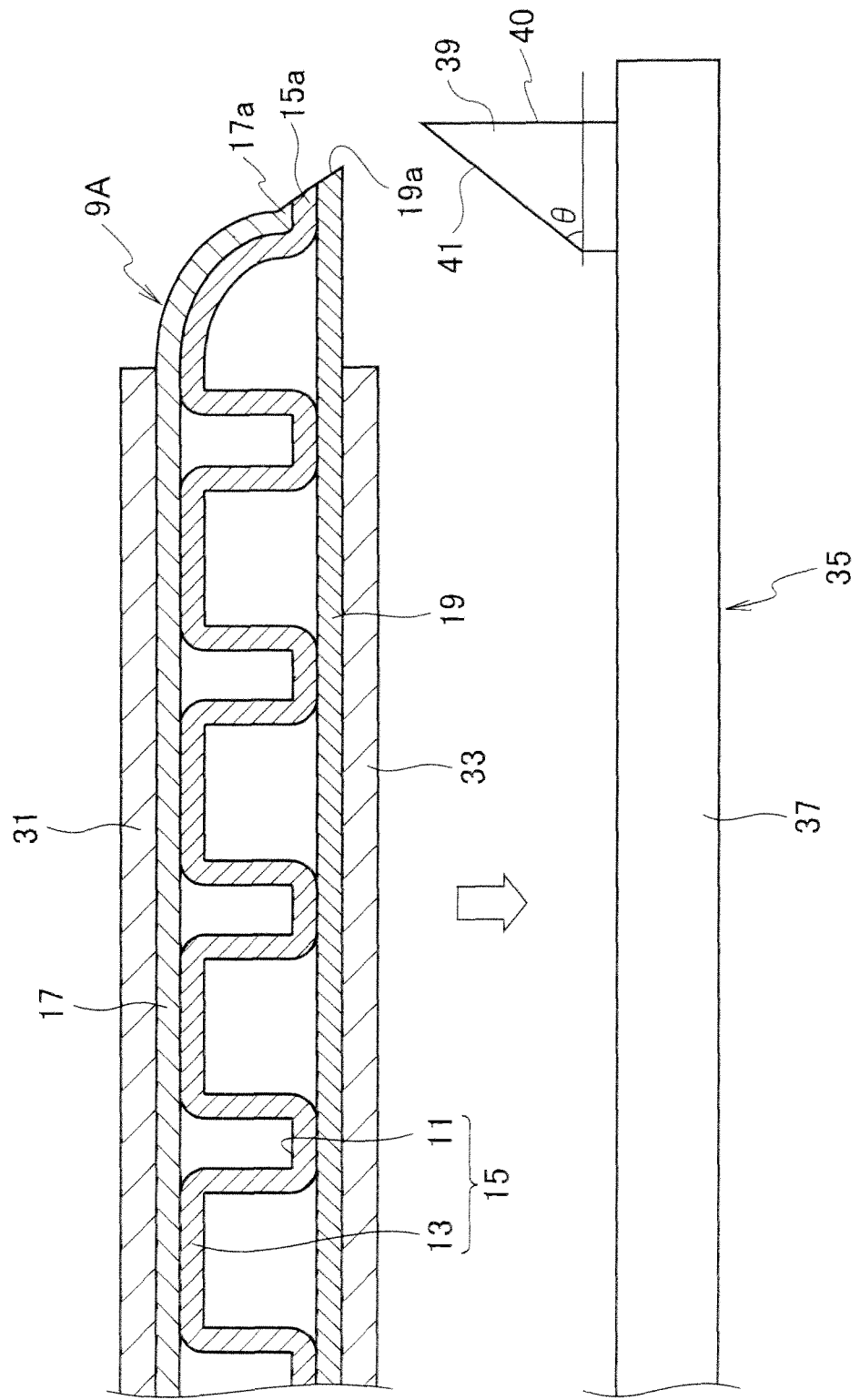
FIG. 5 is a cross-sectional view showing a state where an edge of the intermediate molded part is put close to a heat block.

Subsequently, as shown in FIG. 5, the intermediate molded board 9A is held by the holder plates 31 and 33 from its above and underneath, and then moved downward as shown by an arrow in FIG. 5. An inclined-portion forming base 35 is preliminarily disposed under the intermediate molded board 9A. The base 35 includes a plate-shaped base body 37 and a heat block 39 fixed on a side end of the base body 37. The heat block 39 has a vertical face 40 extending vertically and an inclined face 41 inclined downward from a top ridge of the vertical face 40. The inclined face 41 is inclined by an inclined angle θ to a planar direction of the base body 37. This inclined angle θ is identical to the above-explained inclined angle θ (see FIG. 3) of the inclined portion 23 of the deck board 9 to be formed. Therefore, the inclined angle θ of the inclined face 41 is set to 45° to 65°, preferably set to 50° to 60°. Note that the heat block is heated at 160 to 190° C. that is adequate temperature for softening the edge of the intermediate molded board 9A.

Figure 6:
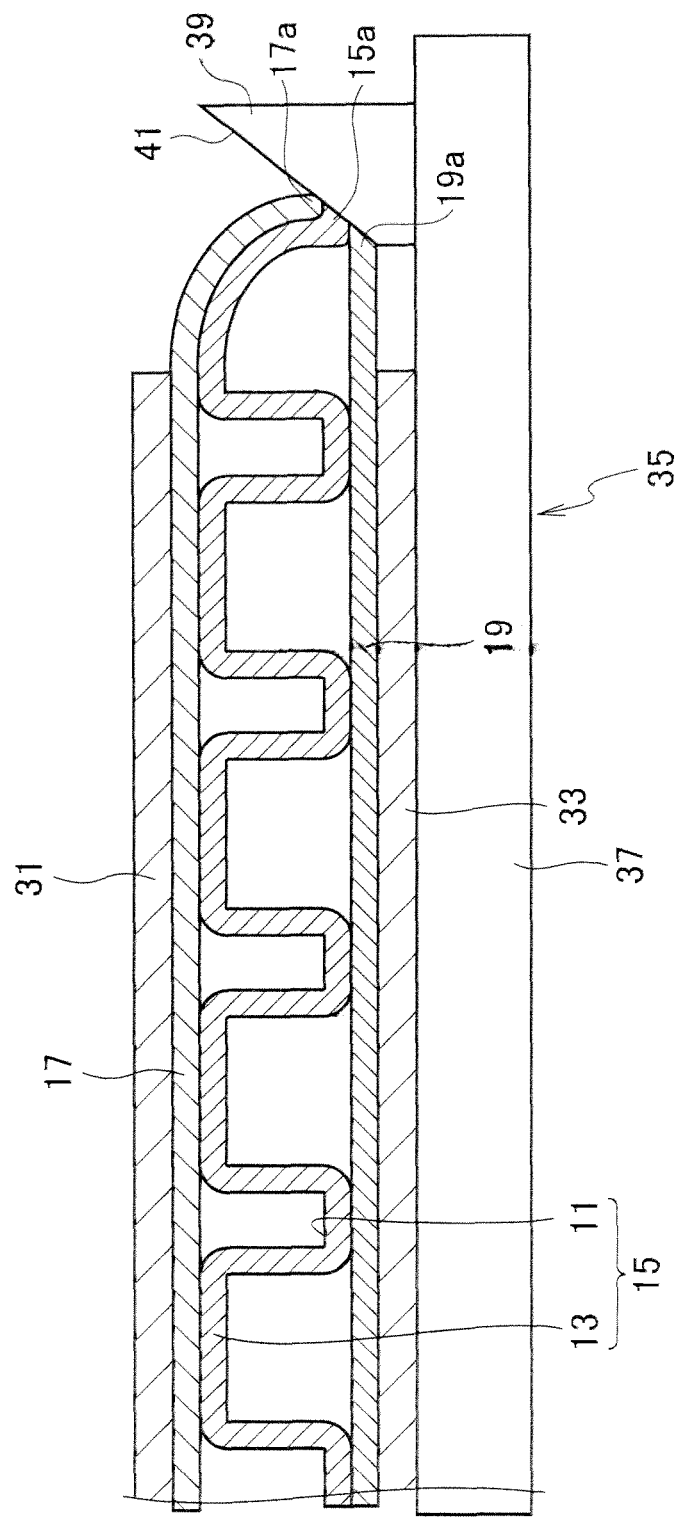
FIG. 6 is a cross-sectional view showing a state where the edge of the intermediate molded part is pushed onto the heat block.
Figure 7:
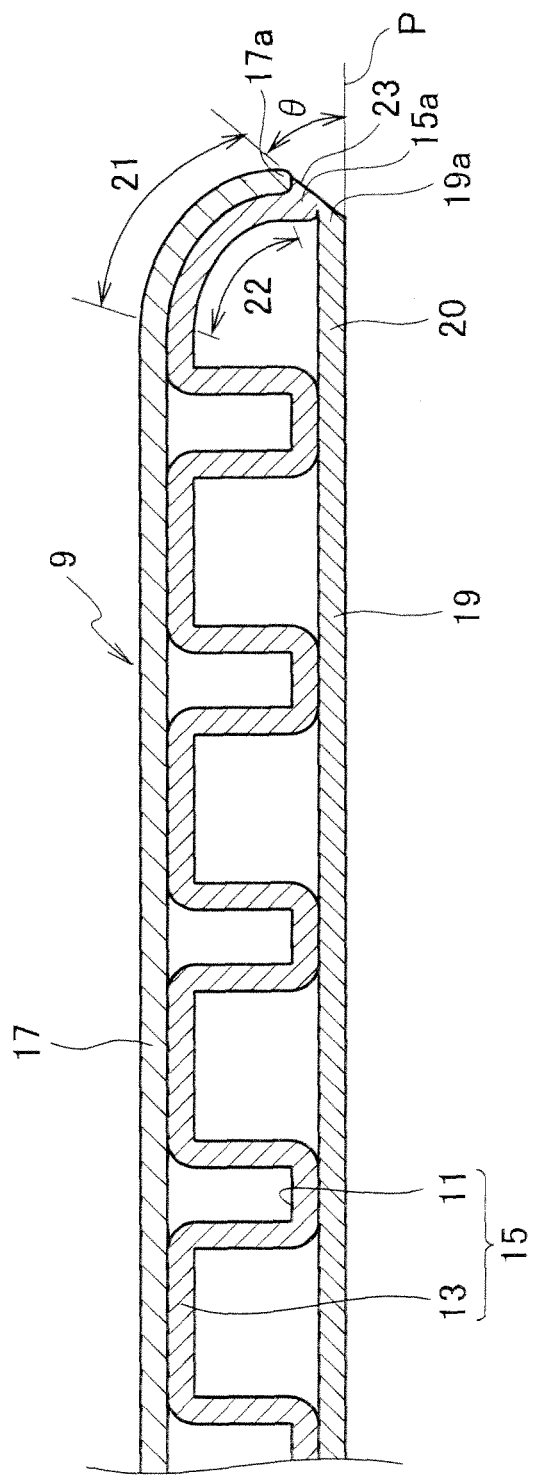
FIG. 7 is a cross-sectional view showing the deck board according to an embodiment.

Then, as shown in FIG. 6, the intermediate molded board 9A held by the holder plates 31 and 33 is mounted onto the base body 37. Specifically, the holder plate 33 is mounted onto the base body, and the edges 17a, 15a and 19a are pressed onto the inclined face 41 of the heat block 39 for five to ten seconds. Since the heat block 39 is heated, the edges 17a, 15a and 19a are softened and the above-explained inclined portion 23 is formed as shown in FIG. 7. In the present embodiment, formation of the inclined portion 23 by heating and softening the edges 17a, 15a and 19a is the chamfer treatment. The finally-produced deck board shown in FIG. 7 has the same configuration as that of the deck board 9 explained with reference to FIG. 3.

Note that, if the temperature of the heat block 39 is lower than 160° C., the edges 17a, 15a and 19a are not softened sufficiently. If the temperature of the heat block 39 is higher than 190° C., the edges 17a, 15a and 19a are softened excessively and thereby weld flashes may be formed. In addition, if the time for pressing the edges 17a, 15a and 19a onto the heat block is shorter than five seconds, the edges 17a, 15a and 19a are not softened sufficiently. If the time for pressing the edges 17a, 15a and 19a onto the heat block is longer than ten seconds, the edges 17a, 15a and 19a are softened excessively and thereby weld flashes may be formed.

Hereinafter, advantages according to the present embodiment will be explained.

(1) The deck board (interior part) 9 according to the present embodiment includes the body member 15 that is made of plastic and includes the protrusions 11 and the depressions 13, the first member 17 that is made of plastic to have a flat sheet shape and attached to one side of the body member 15, and the second member 19 that is made of plastic to have a flat sheet shape and attached to another side of the body member 15. The side end 21 of the first member 17 is extended toward the side end 20 of the second member 19 in a convex manner. The edge 17a of the side end 21 of the first member 17 is fixed with the edge 19a of the side end 20 of the second member 19 via the edge 15a of the side end 22 of the body member 15. The edges 17a, 15a and 19a of the first member 17, the body member 15 and the second member 19 are processed by the chamfer treatment to form the inclined portion 23 outwardly inclined from the second member 19 toward the first member 17.

Therefore, the deck board (interior part) 9 according to the present embodiment includes the above-explained inclined portion 23 formed by the chamfer treatment. The inclined portion 23 extends slantwise (is outwardly inclined) from the second member 19 toward the first member 17, unpleasant feeling to be brought to a user when touching the inclined portion 23 is drastically restricted. Namely, if the edge of the deck board 9 is formed as the sharp face 26 protruded outward as shown in FIG. 4, a user may feel pricks when he/she touches the sharp face 26. However, the inclined portion 23 is formed by the chamfer treatment in the present embodiment, so that unpleasant feeling is hardly brought to a user.

(2) The inclined angle θ of the inclined portion 23 to the planar direction P of the second member 19 is set to 45° to 65° in the present embodiment. As explained above, if the inclined angle θ is smaller than 45°, the edge of the deck board 9 may be formed as a sharp edge protruding in the planar direction P and thereby the sharp edge may bring unpleasant feeling to a user when he/she touches the edge of the deck board 9. If the inclined angle θ is larger than 65°, the inclined portion 23 may excessively squashed and thereby appearance of the edge of the deck board 9 may degraded and weld flashes may be formed frequently. Therefore, it is preferable to set the inclined angle θ to 45° to 65°.

(3) The inclined portion 23 is formed by pressing the edges 17a, 15a and 19a and the heat block 39 onto each other (the chamfer treatment) in the present embodiment. In this manner, it is possible to form the inclined portion 23 by such a simple process (pressing the edges 17a, 15a and 19a onto the heat block 39). In addition, defective finishes such as weld flashes and delamination of the sealed edges 17a, 15a and 19a can be restricted.

(4) By attaching a skin material to at least one of an outer surface of the first member 17 and an outer surface of the second member 19, it becomes possible to improve appearance of the deck board 9. In addition, a skin material on the inclined portion 23 is compressed by heat of the heat block 39 and thereby the compressed skin material on the inclined portion 23 brings good tactile feeling.

(5) In the method for treating the edge of the deck board (interior part) 9 according to the present embodiment, the intermediate molded board 9A is made by bending the side end 21 of the first member 17 toward the side end 20 of the second member 19 in a convex manner and then fixing the edge 17a of the side end 21 of the first member 17 with the edge 19a of the side end 20 of the second member 19 via the edge 15a of the side end 22 of the body member 15. Then, the heat block 39 that has the inclined face 41 whose inclined angle θ is set to 45° to 65° is heated to 160° C. to 190° C. And then, the edges 17a, 15a and 19a of the first member 17, the body member 15 and the second member 19 are pressed onto the inclined face 41 of the heat block 39 for five to ten seconds to form the inclined portion 23. Therefore, defective finishes such as weld flashes and delamination of the sealed edges 17a, 15a and 19a can be restricted Test pieces are made by the above-explained treatment method for the edge of the deck board 9 with various conditions as shown in a Table 1, and sensory evaluation tests are made for the test pieces. Results of the tests are also shown in the Table 1. Note that a symbol "E" in a column "WELD FLASH" indicates that weld flashes exist, and another symbol "N/E" indicates that no weld flash exists. A symbol "A" in a column "SENSORY EVALUATION" indicates that unpleasant feeling is not brought when touching the edge, a symbol "B" indicates that unpleasant feeling is slightly brought, and a symbol "C" indicates that unpleasant feeling is brought.

TABLE 1

| INCLINED ANGLE θ OF HEAT BLOCK | TIME FOR PRESSING ONTO HEAT BLOCK | TEMPERATURE OF HEAT BLOCK | WELD FLASH | SENSORY EVALUATION |
| --- | --- | --- | --- | --- |
| 75° | 5 sec | 160° C. | E | C |
|  |  | 190° C. | E | C |
|  | 10 sec | 160° C. | E | C |
|  |  | 190° C. | E | C |
| 65° | 5 sec | 160° C. | N/E | A |
|  |  | 190° C. | N/E | B |
|  | 10 sec | 160° C. | N/E | A |
|  |  | 190° C. | N/E | B |
| 60° | 5 sec | 160° C. | N/E | A |
|  |  | 190° C. | N/E | A |
|  | 10 sec | 160° C. | N/E | A |
|  |  | 190° C. | N/E | A |
| 50° | 5 sec | 160° C. | N/E | A |
|  |  | 190° C. | N/E | A |
|  | 10 sec | 160° C. | N/E | A |
|  |  | 190° C. | N/E | A |
| 45° | 5 sec | 160° C. | N/E | B |
|  |  | 190° C. | N/E | A |
|  | 10 sec | 160° C. | N/E | B |
|  |  | 190° C. | N/E | A |
| 35° | 5 sec | 160° C. | E | C |
|  |  | 190° C. | E | C |
|  | 10 sec | 160° C. | E | C |
|  |  | 190° C. | E | C |

It is obvious from the Table 1 that, in cases of the inclined angle θ=75°, weld flashes are formed and unpleasant feeling is slightly brought regardless of the pressing time and the temperature. Specifically, an area of the inclined portion 23 becomes large and welt plastic grows downward to form weld flashes, so that the edge brings sharply-angulated feeling when toughed.

In addition, in cases of the inclined angle θ=65°, the test pieces by the temperature 160° C. get "A" in the sensory evaluation regardless of the inclined angle θ, but the test pieces by the temperature 190° C. get "B" in the sensory evaluation regardless of the inclined angle θ. On the contrary, in cases of the inclined angle θ=45°, the test pieces by the temperature 190° C. get "A" in the sensory evaluation regardless of the inclined angle θ, but the test pieces by the temperature 160° C. get "B" in the sensory evaluation regardless of the inclined angle θ.

The test pieces with the inclined angle θ=45° to 65° doesn't bring sharply-angulated feeling when toughed, so that they get good results as an overall evaluation. Especially, the test pieces with the inclined angle θ=50° and 60° get excellent results as an overall evaluation. Therefore, it becomes obvious that it is preferable to set the inclined angle θ of the heat block 39 (the inclined portion 23 of the deck board 9) to 45° to 65° and that it is further preferable to set the inclined angle θ to 50° to 60°.

Note that the present invention is not limited to the above embodiment, and various modifications and revisions may be made in the scope of the present invention. For example, the inclined portion 23 is formed as a flat plane (linearly in the cross-section) in the above embodiment, but it may be formed as a convex plane (curvedly in the cross-section). In addition, the present invention is applied to the deck board 9 in the above embodiment, but it may be applied to other interior parts such as a door trim. Further, the deck board 9 is a plastic corrugate board in the above embodiment, but the deck board 9 as an interior part may be a plastic honeycomb board, a plastic board having a structure similar to a bubble wrap whose both surfaces are flat.

Furthermore, the method of pressing the edges 17a, 15a and 19a onto the heat block 39 is adopted as a chamfer treatment in the above embodiment, but a method of pressing a movable heat block onto the edges 17a, 15a and 19a that are fixedly held may be adopted. Namely, in a chamfer treatment, the edges 17a, 15a and 19a and the heat block 39 may be pressed onto each other.

The present application claims the benefit of priorities under 35 U.S.C. §119 to Japanese Patent Application No. 2012-93537, filed on Apr. 17, 2012, the entire content of which is incorporated herein by reference.

What is claimed is:

1. An interior part for a vehicle, comprising:
    a body member that is made of plastic and includes a plurality of protrusions and a plurality of depressions;
    a first member that is made of plastic to have a flat sheet shape and attached to one side of the body member; and
    a second member that is made of plastic to have a flat sheet shape and attached to another side of the body member, wherein
    a side end of the first member is extended toward a side end of the second member in a convex manner,
    an edge of the side end of the first member is fixed with an edge of the side end of the second member via an edge of a side end of the body member, and
    the edges of the first member, the body member and the second member form an inclined portion outwardly inclined from the second member toward the first member, such that the inclined portion forms an outer most surface of the part and the edge of the side end of the first member, the edge of the side end of the second member and the edge of the side end of the body member are exposed on the outer most surface of the part.

2. The interior part according to claim 1, wherein
    an inclined angle of the inclined portion to a planar direction of the second member is set to 45° to 65°.

3. The interior part according to claim 1, wherein
    the inclined portion is formed by pressing the edges of the first member, the body member and the second member and a heat block onto each other.

4. The interior part according to claim 1, further comprising
    a skin material attached to at least one of an outer surface of the first member and an outer surface of the second member.

5. A method for treating an edge of an interior part that includes a body member that is made of plastic and includes a plurality of protrusions and a plurality of depressions, a first member that is made of plastic to have a flat sheet shape and attached to one side of the body member, and a second member that is made of plastic to have a flat sheet shape and attached to another side of the body member,
    the method comprising:
    making an intermediate molded part by bending a side end of the first member toward a side end of the second member in a convex manner and then fixing an edge of the side end of the first member with an edge of the side end of the second member via an edge of a side end of the body member,
    heating a heat block to 160° C. to 190° C., the heat block having an inclined face whose inclined angle is set to 45° to 65°; and
    pressing the edges of the first member, the body member and the second member onto the inclined face of the heat block for five to ten seconds to form an inclined portion
    to produce the interior part of claim 1.

* * * * *